United States Patent [19]
Hester et al.

[11] 3,916,943
[45] Nov. 4, 1975

[54] PLASTIC LINED PLUG VALVE

[75] Inventors: Clarence H. Hester, Houston;
Willard L. Petrosky, Alief; Joseph T. Stewart, Jr.; Burleigh R. Murphree, both of Houston; Gail W. Graves, Richmond, all of Tex.

[73] Assignee: John L. Dore' Co., Fort Bend County, Tex.

[22] Filed: Aug. 27, 1973

[21] Appl. No.: 392,031

[52] U.S. Cl. ............... 137/375; 251/309; 251/317; 251/214; 251/369
[51] Int. Cl.² ..................... F16K 27/00; F16K 5/06
[58] Field of Search ............ 137/375; 264/127, 269; 251/359, 360, 214, 363, 314, 315, 309, 316, 317

[56] References Cited
UNITED STATES PATENTS

| | | | |
|---|---|---|---|
| 3,160,387 | 12/1964 | Windsor | 251/309 X |
| 3,314,643 | 4/1967 | Sachnik | 251/309 |
| 3,425,451 | 2/1969 | Smith | 251/309 X |
| 3,438,388 | 4/1969 | Schenck, Jr. | 137/375 |
| 3,521,856 | 7/1970 | Smith | 251/309 X |
| 3,698,422 | 10/1972 | Freed | 137/375 |

*Primary Examiner*—Martin P. Schwadron
*Assistant Examiner*—Robert J. Miller
*Attorney, Agent, or Firm*—Fulbright & Jaworski

[57] ABSTRACT

A plug valve with a body having an inlet and an outlet with a tapered rotatable plug between the inlet and the outlet. The plug and valve body lined with a thermoplastic coating. Separate replaceable sealing valve seats are provided about the inlet and the outlet which can be replaced in the event that the seat becomes worn without the necessity of scrapping the valve body or plug. The seals including seating surfaces shaped to coact with the conical plug and spaced from the valve body and toward the valve plug whereby the plug will contact only the seals to provide a lower operating torque, better sealing, and direct wear to the seals. Adjustable means are provided for holding the valve plug in a sealing relationship with the seals.

2 Claims, 3 Drawing Figures

: 
PLASTIC LINED PLUG VALVE

BACKGROUND OF THE INVENTION

The use of a tapered plastic lined plug valve for carrying corrosive fluids is old such as shown in U.S. Pat. No. 3,703,910. The present invention is generally directed to an improved plastic lined plug valve having (1) replaceable seats which experience the major part of the wear, and which can be easily replaced without requiring scrapping of the entire valve, (2) a valve which requires only a low turning torque, and (3) a valve in which the coating surfaces of the body are protected, and in which the coating surfaces of the plug valve element are subjected to a minimum of wear.

SUMMARY

The present invention is directed to an improved plastic lined plug valve in which the interior of the valve body including the inlet and outlet and the exterior of the rotatable conical valve element are coated with a thermoplastic coating. A replaceable plastic seal is provided between the valve body and the valve plug element between the plastic coatings thereon. The majority of the valve wear occurs on the valve seals which may be easily replaced without scrapping the valve body or valve plug element.

A further object of the present invention is to provide for adjustable means for holding the valve plug element in a desired pressure sealing relationship with the seals which has the advantage that the tapered plug may be moved as wear occurs on the seals for spreading the wear on the valve plug over a wider area thereby lengthening the life of the plastic coating on the tapered plug element.

Still a further object of the present invention is the provision of spacing the seating surfaces of the seals from the interior of the valve body and towards the valve element whereby the valve element will only contact the seals thereby preventing rubbing and wear between the coated surface on the tapered plug and the coated surface on the valve body, and providing a minimum seating area so that lower operating torque is required to rotate the plug valve, and in addition higher sealing pressures may be obtained between the tapered valve plug and the sealing seats.

Still other and further objects, features and advantages will be apparent from the following description of the presently preferred embodiment of the invention, given for the purpose of disclosure and taken in conjunction with the accompanying drawings.

DESCRIPTION OF THE PREFERRED EMBODIMENT

Figure 1:
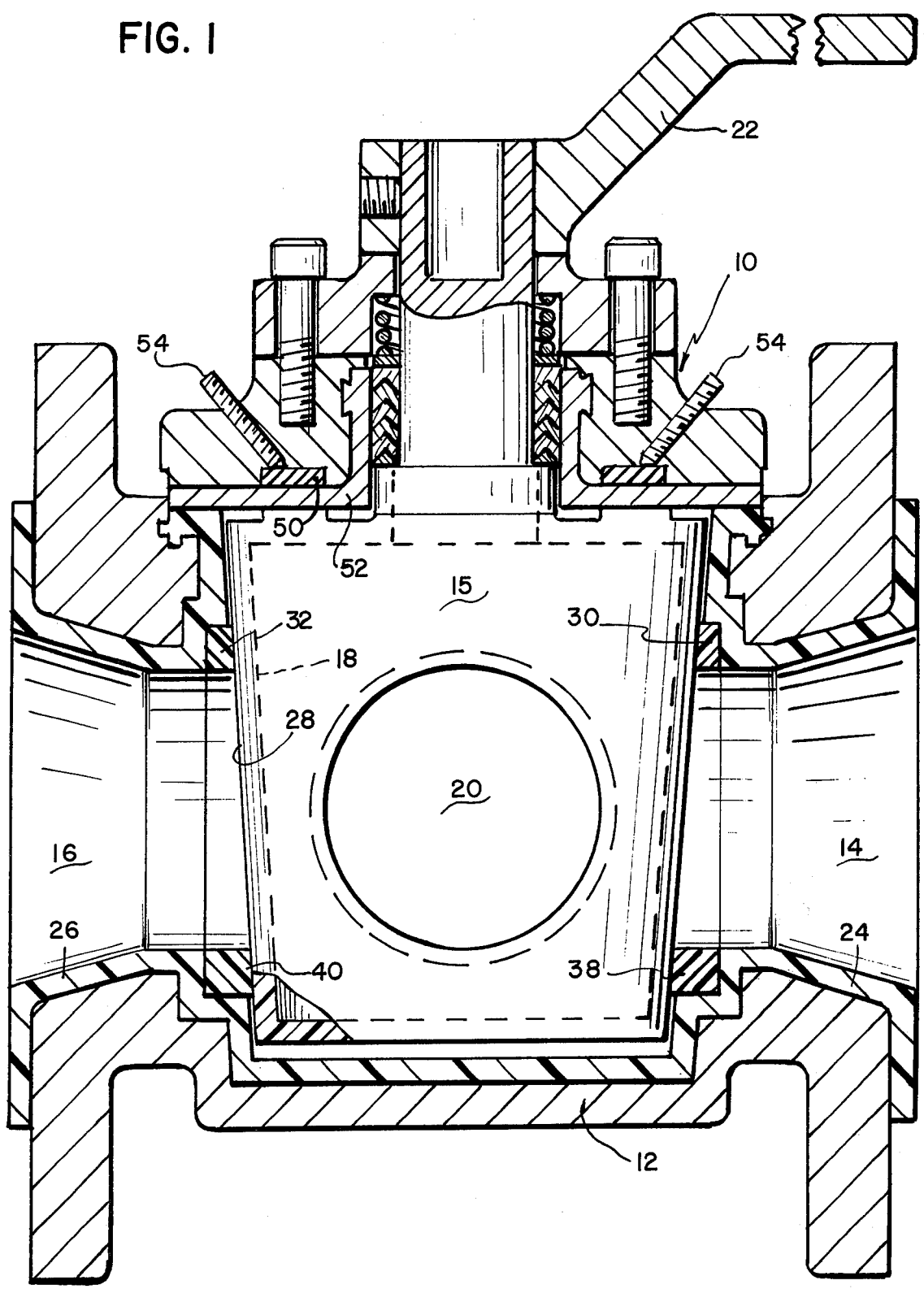
FIG. 1 is an elevational view, in cross section, of the valve of the present invention shown in the closed position.

Referring now to the drawings, and particularly to FIG. 1, the reference numeral 10 generally indicates the valve of the present invention, and includes a valve body 12 having openings 14 and 16, one of which may be the inlet and the other is the outlet, and which are preferably coaxially aligned with the longitudinal axis of the valve body 12.

Rotatably mounted in the valve body 12 is a plug valve element 15 which may be a frustum of a right circular cone having a tapered exterior 18 and including a passageway 20 therethrough which, when positioned as shown in FIG. 1, prevents flow between the inlet and outlet 14 and 16 and which, when rotated into alignment with the longitudinal axis of the body 12, allows passage of fluid through the valve 10. Suitable means may be connected to the plug valve element 15 for rotation such as a handle 22. The axis of the rotatable plug valve 15 is generally perpendicular to the longitudinal axis of the body 12.

The interior of the body 12 is provided with a suitable thermoplastic coating such as 24 about the inlet 14, and 26 about the outlet 16 and the exterior of the plug valve element 15 includes a thermoplastic coating 28. The coating may be any suitable plastic, such as a fluorocarbon material, as for example as sold by the John L. Doré Co., under the trademark FLUOROGREEN E-1600 for protecting the body 12 and plug 15 from damaging effects of corrosive fluids.

Figure 2:
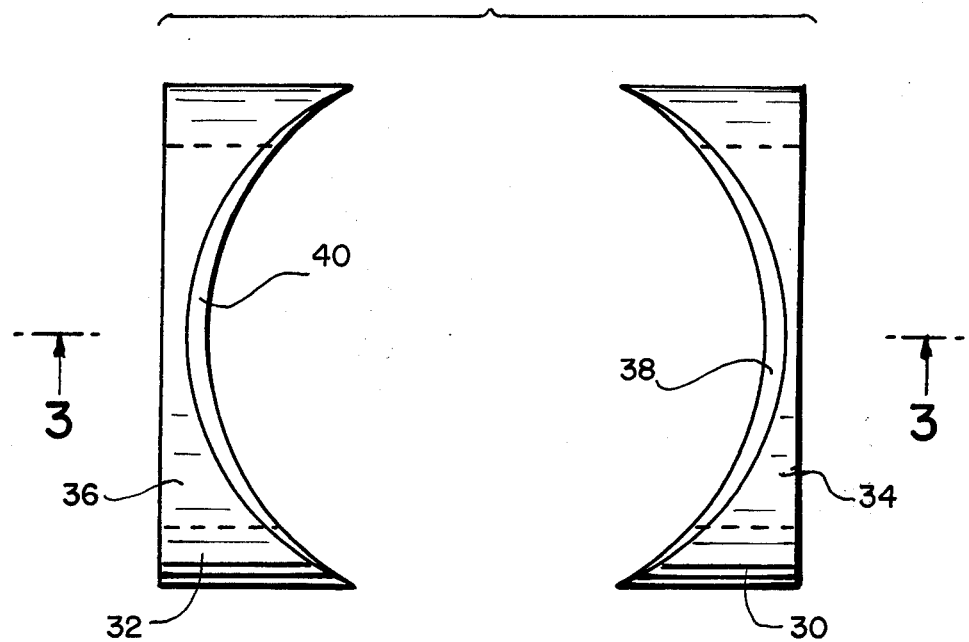
FIG. 2 is an elevational top view of the valve seats of the present invention.
Figure 3:
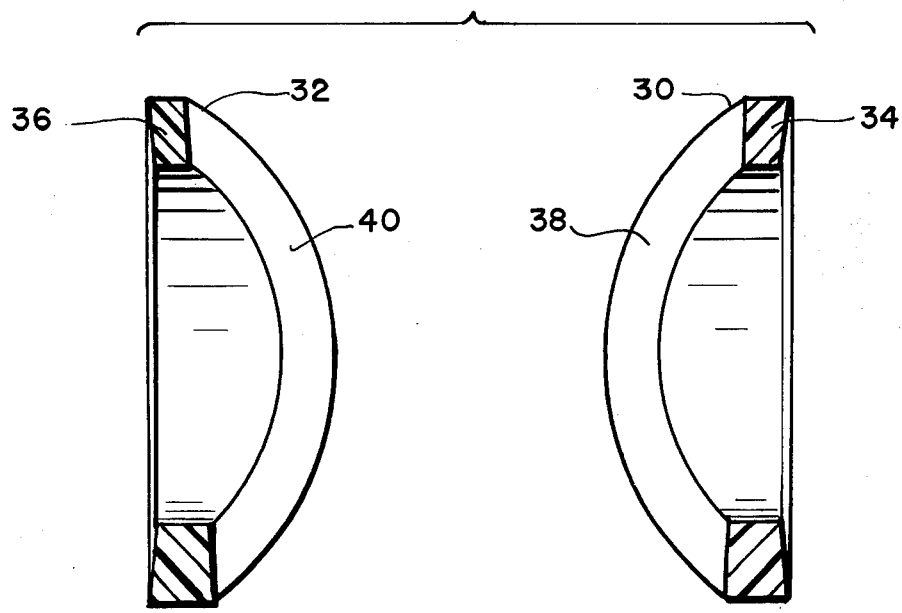
FIG. 3 is a cross-sectional view taken along the line 3—3 of FIG. 2.

Referring now to FIGS. 1, 2 and 3, a replaceable plastic seal is provided in the body 12 adjacent and surrounding the inlet 14 and the outlet 16. Thus, a seal 30 is provided about the inlet 14 and a seal 32 is provided about the outlet 16. Each of the seals 30 and 32 include a tubular body 34 and 36, respectively, and a sealing seating surface 38 and 40, respectively. The sealing surfaces 38 and 40 are shaped and contoured to coact with the conical surface of the plastic coating 28 on the plug valve element 15. Therefore, the seating surfaces 38 and 40 are conically tapered surfaces. It is to be noted that the seals 30 and 32 are positioned between the plastic coating on the body and the plastic coating on the valve plug 15. Thus, seal 30 is positioned between plastic coating 24 and plastic coating 28, while seal 32 is positioned between plastic coating 26 and plastic coating 28. In addition, it is noted that the sealing or seating surfaces 38 and 40 are spaced from the interior of the valve body 12 and coatings 24 and 26, and towards the valve element 15 whereby the plastic coating 28 on the valve element 16 will contact only the seating surfaces 38 and 40. The coating 28 on the plug element 15 will not contact the coatings 24 and 26 on the valve body 12. Therefore, there will be no wear and rubbing between the plastic coating 28 and the coatings 24 and 26. Another advantage of this feature is that the seating area is reduced to a minimum to provide a valve in which the operating torque required to rotate the plug valve 15 is a minimum. Another advantage is that with a minimum seating area, the sealing pressure in the valve may be easily increased to any suitable value by increasing the pressure of the valve element 15 against the seals 30 and 32.

Another important feature of the present invention is that a majority of the wear occurs on the valve seats 30 and 32 as compared to the wear on the rotating plug valve 15 (approximately 85% on the seats 30 and 32 and 15% on the plug valve 15) and that substantially no wear occurs on the plastic coatings 24 and 26 of the valve body 12. This valve has the advantage that the seats 30 and 32 may be replaced, in the event that they become worn or scored causing leaks, without requiring scrapping or replacement of the complete valve 10.

In order to provide the desired seal between the valve element 16 and the seals 30 and 32, any suitable means may be provided for holding the element 15 in contact with the seals 30 and 32. For example, an adjusting ring 50 may be provided bearing against an upper plastic liner 52 which in turn bears against the upper end of the plug valve element 15 to provide proper seating of the element 15 on the seats 30 and 32, as well as functioning to provide a positive seal between the interior of the valve body 12 and the top portion of the valve. If desired, set screws 54 may be provided to adjust the compression of the adjusting ring 50 against the top of the valve element 15 and for adjusting the pressure between the element 15 and the seals 30 and 32. In addition, the set screws 54 may be suitably adjusted as wear occurs in the seats of the seals 30 and 32 to maintain the desired pressure. It is further noted that adjusting the set screws 54 as wear occurs during the life of the valve 10 tends to spread the wear on the coating 28 of the plug valve 15 over a larger area thereby increasing the life of the coating 28 and plug valve element 15 and again concentrating the wear on the replaceable seals 30 and 32.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts may be made which will readily suggest themselves to those skilled in the art and which are encompassed within the spirit of the invention and the scope of the appended claims.

What is claimed is:

1. A plastic lined plug valve comprising,
a body having an inlet and an outlet,
a plug valve element positioned in the body between the inlet and the outlet, said valve element including a conical section,
the entire interior of the body including the inlet and the outlet and the exterior of the plug valve element being coated with a thermoplastic coating,
a replaceable seal in the body adjacent and encircling each of the inlet and the outlet inside of the valve body coating, each of said seals including a tubular body having a seating surface at one end of the tubular body shaped to coact with the surface of the conical section of the valve element, said seating surfaces spaced from the coating on the valve body and toward the element for preventing engagement between the coating on the body and the coating on the element, and
means urging the valve element into a sealing relationship with said seals.

2. A plastic lined plug valve comprising,
a body having a longitudinal axis and including an inlet and an outlet coaxially aligned with the body axis,
a rotatable plug valve element positioned in the body between the inlet and the outlet and including a conical section, the axis of the valve element being generally perpendicular to the body axis,
the entire interior of the body and the exterior of the plug valve element including a thermo-plastic coating,
a replaceable fluorocarbon plastic seal in the body adjacent and encircling each of the inlet and the outlet and positioned between the coating on the body and the coating on the valve element, each of said seals including a tubular body coaxially aligned in the body and having a seating surface on one end of the tubular body shaped to coact with the surface of the conical section of the valve element, said seating surfaces spaced from the coating on the interior valve body and toward the valve element whereby the element will contact the seals instead of the valve body,
said coating in the valve body including a circular notch about and against each of the inlet and the outlet and the second ends of each of the tubular seals positioned in one of said notches, and
adjustable means including an adjusting ring acting against the valve element for longitudinally holding the valve element into a sealing relationship with the seals.

* * * * *